United States Patent [19]
Yokoyama et al.

[11] 3,758,851
[45] Sept. 11, 1973

[54] METHOD FOR DETECTING SMALL PARTICLES IN A TANK AND APPARATUS FOR CARRYING OUT SAID METHOD

[75] Inventors: Tohru Yokoyama, Sagamihara; Tetsuo Kanda, Yokohama; Yudo Oshio, Kawasaki; Akira Yoshimatsu, Yokosuka, all of Japan

[73] Assignee: Chiyoda Kako Kensetsu Kabushiki Kaisha, Yokohama, Japan

[22] Filed: Oct. 26, 1971

[21] Appl. No.: 192,156

[30] Foreign Application Priority Data
Oct. 27, 1970 Japan.............................. 45/93936
Apr. 2, 1971 Japan.............................. 46/19605

[52] U.S. Cl............................ 324/61 QS, 324/71 CP
[51] Int. Cl............................................. G01c 27/26
[58] Field of Search...................... 324/61 QS, 61 R, 324/65 R, 57 Q, 71 CP

[56] References Cited
UNITED STATES PATENTS

| | | | |
|---|---|---|---|
| 2,772,393 | 11/1956 | Davis............................ | 324/61 QS |
| 3,067,385 | 12/1962 | Rykoskey...................... | 324/71 CP |
| 3,114,257 | 12/1963 | Foster et al.................... | 324/61 QS |
| 2,838,378 | 6/1958 | Shawhan........................ | 324/61 R X |
| 2,671,200 | 3/1954 | Lederer.......................... | 324/61 QS |
| 3,390,326 | 6/1968 | Imadate......................... | 324/61 R |
| 2,337,132 | 12/1943 | Shaw.............................. | 324/61 QS |

Primary Examiner—Stanley T. Krawczewicz
Attorney—Kurt Kelman

[57] ABSTRACT

The existence of small particles in a tank is detected by providing a pair of electrodes in the tank containing the particles to be detected, applying across the electrodes a frequency voltage high enough to occur dielectric dispersion in the particles, and measuring the changes in impedance caused by the existence of the small particles in the space between the electrodes which changes occur as a result of the changes in the real part of the dielectric constant of the particles and the imaginary part thereof resulting from dielectric dispersion. In a case where the size of the tank is large, the detection of the existence of the small particles is performed by forming a distribution resonant circuit using the distributed constants existing in the electrodes or the lead wires extending therefrom and detecting the change of the standing wave thereon.

4 Claims, 5 Drawing Figures

METHOD FOR DETECTING SMALL PARTICLES IN A TANK AND APPARATUS FOR CARRYING OUT SAID METHOD

The present invention relates to a method for detecting small particles in a tank and an apparatus for carrying out the same.

Heretofore, there have been various methods for measurement of small particles in a tank such as those utilizing the difference in density in the tank or utilizing the principle of the change in electro-static capacitance. However, although the conventional methods provide a relatively precise measurement of the particles when there are no bubbles in the tank, it is impossible to measure the particles precisely when the fluid to be supplied to the tank contains materials in two phases, i.e., the gas phase and the liquid phase, because the bubbles (gas phase) in the tank are also detected indistinguishably from the small particles. A method is also known in which an ultrasonic transmitting and receiving device is provided in the tank and in which the level of small particles in the tank is detected by measuring the time duration from the transmitting of the ultrasonic wave to the receiving of the same. In this method, however, when the small particles co-exist with bubbles, it is impossible to distinguish the ultra-sonic waves reflected by the particles from those reflected by the bubbles because the ultrasonic wave is also reflected by the bubbles.

In particular, when a reaction is carried out in a tank under severe conditions as in the case of the hydrogenolysis of reduced pressure residual oil which must be performed under 200 atms pressure and at 450° C, the existence of the small particles in the tank is measured by using gamma rays. In this method, the existence of the small particles in the tank is measured by irradiating the particles by gamma rays from the tank to the outside and by a counter measuring the amount of the rays passing though the tank. In this case, however, it is necessary to reduce the wall thickness in the vicinity of the counting area in order to minimize the absorption of gamma rays by the wall. For this reason, the ability of the wall to withstand high pressure is reduced and thus, the possibility of destruction of the wall is increased. On the other hand, if a higher power gamma ray source is used in order to increase the amount of rays passing through, the risk, that is, the biological risk, is considerably increased, and if the sensitivity of the detector is increased without increasing the strength of the gamma source, the preciseness of the measurement is degraded by external noises resulting from welding arcs etc.

One object of the present invention is to provide a method for precisely detecting the existence of small particles in a tank even when such particles coexist with bubbles or, in particular, when the small particles are contained in a tank which is under severe conditions and to provide an apparatus for carrying out the same method.

Other objects and features of the present invention will be described in detail with reference to the accompanying drawings, in which.

In general, an electro-static capacitance of a capacitor formed by a pair of electrodes disposed oppositely varies with the dielectric constant $\epsilon$ of the material existing between the electrodes. The dielectric constant $\epsilon$ of a material comprises a real part $\epsilon'$ and an imaginary part $\epsilon''$. At low frequencies real part $\epsilon'$ does not change with frequency and imaginary part $\epsilon''$ is zero. At very high frequencies, however, both the real and imaginary parts show a change.

Figure 1:
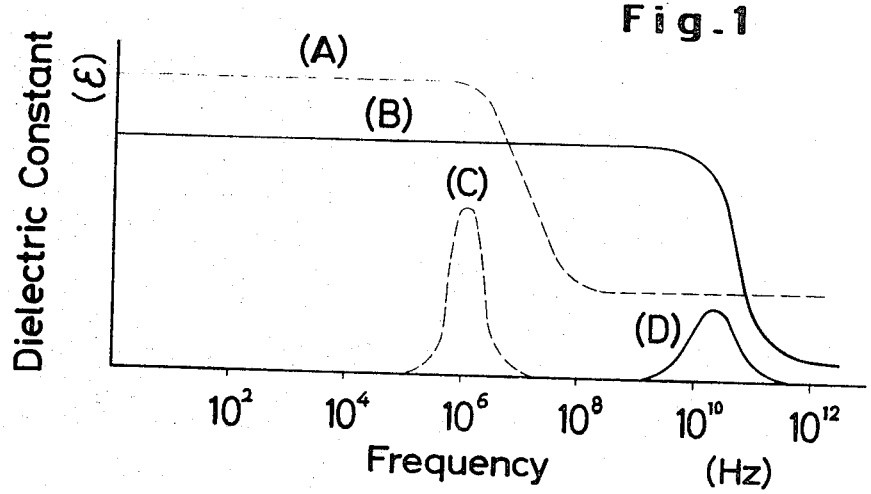
FIG. 1 is a graph showing the dielectric constants of kerosine and of alumina particles.

FIG. 1 is a graph showing the relation of the real part $\epsilon'$ and the imaginary part $\epsilon''$ of the dielectric constant $\epsilon$ of a non-conductive liquid (kerosine) and that of a non-conductive small particulate substance (alumina catalyzer) at different frequencies. In FIG. 1 curve "A" shows the real part of the dielectric constant of the alumina catalyzer, curve "B" shows the real part of the dielectric constant of kerosine, curve "C" shows the imaginary part of the dielectric constant of the alumina catalyzer and curve "D" shows the imaginary part of the dielectric constant of the kerosine.

For the kerosine, since the relaxation time thereof is small, the real part $\epsilon'$ and the imaginary part $\epsilon''$ of the dielectric constant $\epsilon$ are constant at low frequencies and begin to vary at a very high frequency (about $10^{10}$ Hz). On the other hand, since the relaxation time of the alumina catalyzer is large with respect to that of the kerosine, the real part $\epsilon'$ and the imaginary part $\epsilon''$ of the dielectric constant begin to change at a lower frequency (about 1 MHz). A change in the real part and the imaginary part of the dielectric constant is referred to as dielectric dispersion.

The present invention provides a method for accurately detecting the existence of small particles not only by utilizing the change in the real part $\epsilon'$ of the dielectric constant $\epsilon$ of the small particles but also by making positive use of the change in the imaginary part thereof.

The embodiment of the present invention shown in FIG. 2 will now be explained. At a lower portion of a chemical reactor 1, a raw material supply tube 4 is provided through which the raw material (gas phase and liquid phase) is supplied by a circulating pump 3 under a predetermined pressure to fluidize the small particles (catalyzer) in the tank. The products of the reaction are removed through an outlet pipe 6 provided at an upper portion of the tank 1 and then separated into a gas part and a liquid part by a gas-liquid separator 5, a portion of the resulting liquid part being fed back by the circulating pump 3 through a pipe 2 to the tank 1. A pair of electrodes 7 and 8 are oppositely disposed in the tank and maintained at a constant interval by a suitable means. A pair of lead wires 9 and 10 are connected to the electrodes 7 and 8 respectively and the opposite ends thereof are connected to a high frequency oscillator 12 via a detector 11 provided outside of the tank.

Figure 2:
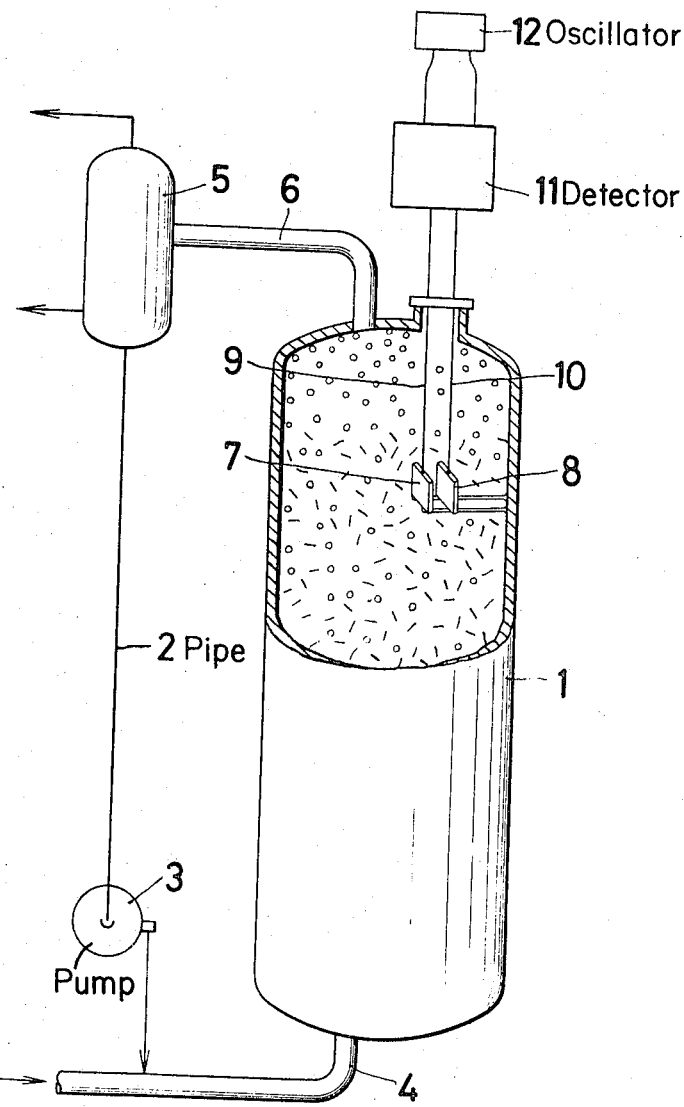
FIG. 2 is a side view partially in section of a tank provided with the apparatus of the present invention.
Figure 3:
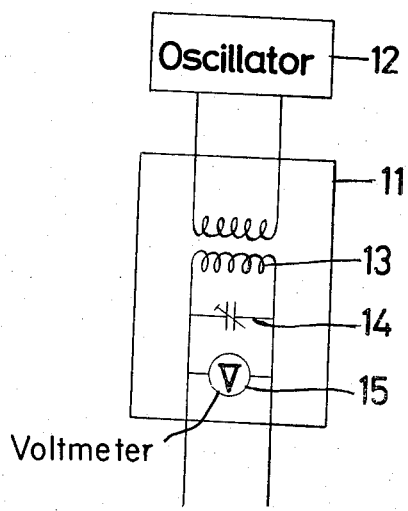
FIG. 3 is a circuit diagram of an example of a detector of the present apparatus.

The operation of this embodiment will first be explained on the assumption that the size of the tank 1 is relatively small and the length of the lead wires 9 and 10 shown in FIG. 2 are negligibly short with respect to the wavelength of the high frequency signal to be used. The output signal of the high frequency oscillator 12 is supplied to the electrodes 8 and 9 via the detector 11. The construction of the detector 11 is shown in FIG. 3 as including a transformer having a coil 13, a trimer capacitor 14 connected in parallel to the coil 13 and a voltmeter 15 also connected in parallel to the coil 13. The lead wires 9 and 10 are connected to the opposite ends of the coil 13 which together with the trimer capacitor 14 and the electrodes 7 and 8 form a resonant circuit. This resonant circuit resonates in response to the high frequency output from the high frequency oscillator 12 and the voltage between the terminals of the resonant circuit is read by the voltmeter 15. In this case, it is also possible to replace the voltmeter with an electric power meter in the high frequency oscillator and read the electric power supplied.

The intrinsic resonance frequency $f$ of the resonant circuit depends upon the capacitances of the electrodes in the tank, the lead wires and the trimer capacitor and the reactance of the coil. When the intrinsic resonant frequency $f$ of the resonant circuit is equal to the oscillation frequency $f_o$ of the output of the high frequency oscillator 12, the electric power supplied becomes minimum and the voltage between the terminals becomes maximum.

The electrostatic capacitance of the capacitor formed by the pair of electrodes in the tank varies depending upon the dielectric constant $\epsilon$ of the material existing between the electrodes. The dielectric constant $\epsilon$ is constituted of the real part $\epsilon'$ and the imaginary part $\epsilon''$. Changes in the real part $\epsilon'$ cause changes in the intrinsic resonance frequency $f$ while the imaginary part $\epsilon''$ acts as a circuit resistor and changes the Q value (sharpness factor) of the resonant circuit.

It is assumed that the oscillation frequency $f_o$ of the oscillator is selected in such a way that the voltage between the terminals of the resonant circuit can be made maximum by adjusting the capacitance of the capacitor 14 to make the intrinsic resonance frequency $f$ of the resonant circuit equal to the output frequency $f_o$ of the high frequency oscillator when there are no small particles between the electrodes. In the absence of small particles between the electrodes, the imaginary part $\epsilon''$ of the dielectric constant is zero and the Q value is relatively large. Under these conditions, when the small particles enter the space between the electrodes, the dielectric constant changes from that of the real part $\epsilon'$ of the liquid to real part $\epsilon'$ of the small particles, so that the intrinsic resonance frequency $f$ is changed and, simultaneously, the imaginary part $\epsilon''$ becomes a certain value other than zero. Thus the Q value is lowered and the voltage between the terminals of the resonant circuit becomes very small.

Figure 4:
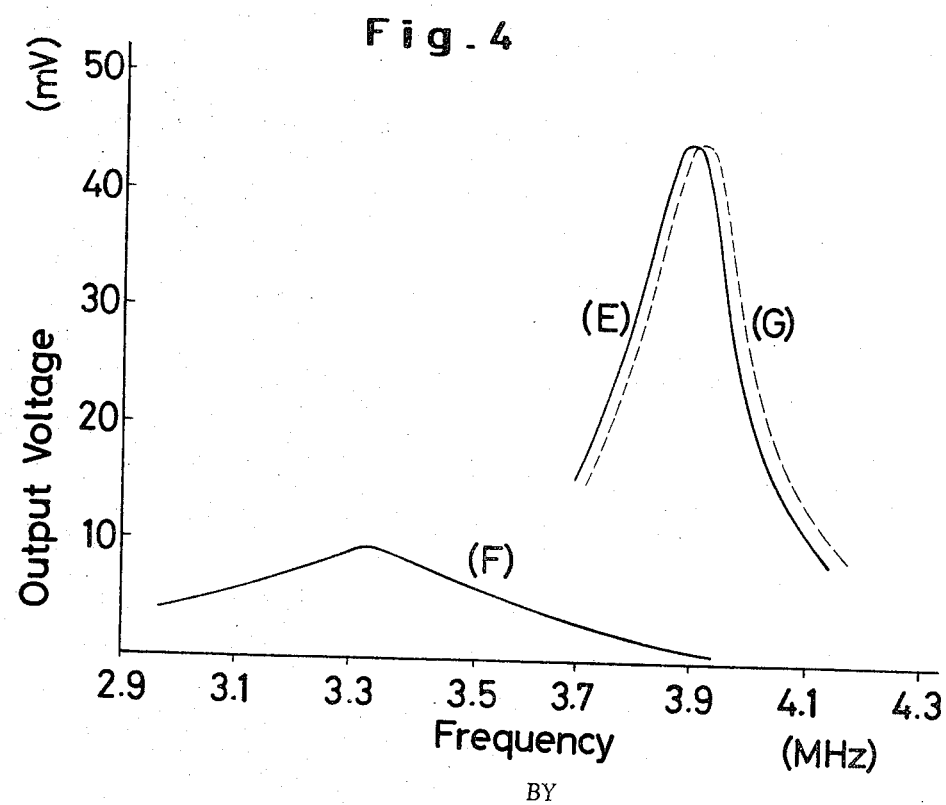
FIG. 4 is a graph showing the voltage variation between the output terminals of the resonant circuit of the present invention; and, FIG. 5 is a graph showing the relation between impedance and frequency of the distribution circuit of the present invention.

FIG. 4 shows data obtained from an example where alumina catalyzer and kerosine were used as the small particles and the liquid. In this example, when the frequency $f_o$ of the oscillator was selected as 3.9 MHz to coincide with the resonant frequency of the resonant circuit, the voltage between the terminals became about 45 mV as shown by curve "E" when there was only liquid between the electrodes and lowered to about 1 mV as shown by a curve "F" when small particles entered the space between the electrodes.

Even where the output frequency of the high frequency oscillator was varied to some extent away from the resonant frequency to, for example, 3.8 MHz, the voltage between the electrodes was about 30 mV when liquid alone was present and became about 2 mV when the catalyzer was present. This difference in voltage is great enough to permit detection of the presence of the catalyzer. The effect of the frequency drift of the oscillator output is thus seen to be relatively small.

The broken-line curve "G" in FIG. 4 shows the voltage variation when bubbles enter the space between the electrodes. As will be clear from this curve, although the resonant frequency drifts slightly because of the bubbles, the Q value is not lowered and the voltage between the electrodes shows almost no change because no dielectric dispersion occurs. Accordingly, even when such bubbles enter the space between the electrodes, the measurement itself is not affected adversely.

Now, a modification of the aforesaid method will be described. This method makes it possible to detect the presence of the small particles where the size of the tank is relatively large or the frequency to be used is very high and thus the length of the lead wires 9 and 10 connecting the electrodes 7 and 8 and the detection circuit 11 in FIG. 2 is no longer negligible with respect to the wavelength of the high frequency signal.

Firstly, where the length of the lead wires to be used is not negligible with respect to the wavelength of the high frequency signal used, a distribution circuit is formed by the lead wires 9 and 10, the electrodes 7 and 8 and the detecting circuit 11 and a standing wave is created thereon.

In this case, when by Q is represented the electrically equivalent length of the electrodes and the lead wires and when by $\lambda$ is represented the wavelength of the high frequency signal, the effect on the impedance Z of the distribution circuit measured from the detector 11 side (that is, the feeding point impedance) of the dielectric constant of the material existing between the electrodes can be considered as follows.

When there are no small particles but only liquid between the electrodes, that is, when the imaginary part $\epsilon''$ of the dielectric constant is zero, the impedance between the electrodes is very high and thus it can be considered that the electrode portion is in the open state. If under these conditions, the frequency being supplied to the resonant circuit by the oscillation circuit is adjusted to satisfy the equation $l=(2n+1)\frac{1}{4}$, the impedance Z becomes zero and conversely if the frequency is adjusted to satisfy the equation $l=n/2\lambda$, the impedance Z becomes infinite ($n$ being any integer). On the other hand, when the small particles enter the space between the electrodes the dielectric constant changes from that of the real part $\epsilon'$ of the liquid to that of the real part $\epsilon'$ of the small particles and simultaneously the imaginary part $\epsilon''$ of the dielectric constant becomes a value other than zero, so that the impedance between the electrodes becomes very small. That is, the electrodes are substantially short-circuited. Consequently, if the conditions of the circuit are adjusted beforehand to fulfill the equation $l=(2n+1)\frac{1}{4}\lambda$, the impedance across the electrodes will change from zero to an infinitely large value upon the entry of the particles therebetween. On the contrary, if the circuit is adjusted to fulfill the equation $l=2\lambda/2$, the impedance will change from infinity to zero.

As stated above, this distribution circuit has the characteristics of a resonant circuit and forms a resonant distribution circuit. Accordingly, if it is assumed that the length of the lead wires 9 and 10 and the frequency of the oscillator are constant, the change in state of the electrodes between the open and the short-circuit states, due to the presence or absence of the small particles between the electrodes, is detected in the detector connected to the ends of the lead wires as the change of the impedance Z.

Accordingly, when the frequency supplied to the distribution circuit is adjusted to satisfy the equation $\lambda = 4l/2n+1$ so that the impedance Z becomes zero when no small particles exist between the electrodes, the frequency detected by the detector will vary when the small particles exist between the electrodes and thus the presence of the small particles between the electrodes can be easily detected.

Alternatively, it is possible to detect the presence of the small particles between the electrodes by utilizing the change of the feeding point impedance Z. That is, the resonance frequency $f_o$ of the distribution circuit is selected in such a manner that the dielectric dispersion occurs in not the liquid but the small particles (in FIG. 1, it occurs at about $10^6$ Hz) and the frequency $f$ is selected in such a manner that the impedance Z (feeding point impedance) of the distribution circuit measured from the detector end becomes minimum where no small particles exist between the electrodes. In this case, since the impedance between the electrodes is large, the resonant distribution circuit resonates at $l=(2n+1)\frac{1}{4}\lambda$. When the small particles enter the space between the electrodes, the impedance between the electrodes becomes very small. If it is assumed that the oscillation frequency and the length $l$ of the lead wires are constant, the anti-resonance mode is established and thus the impedance Z at the detector terminals becomes infinity. By reading out the change of this impedance by means of the detector, the small particles existing between the electrodes can be detected.

Figure 5:
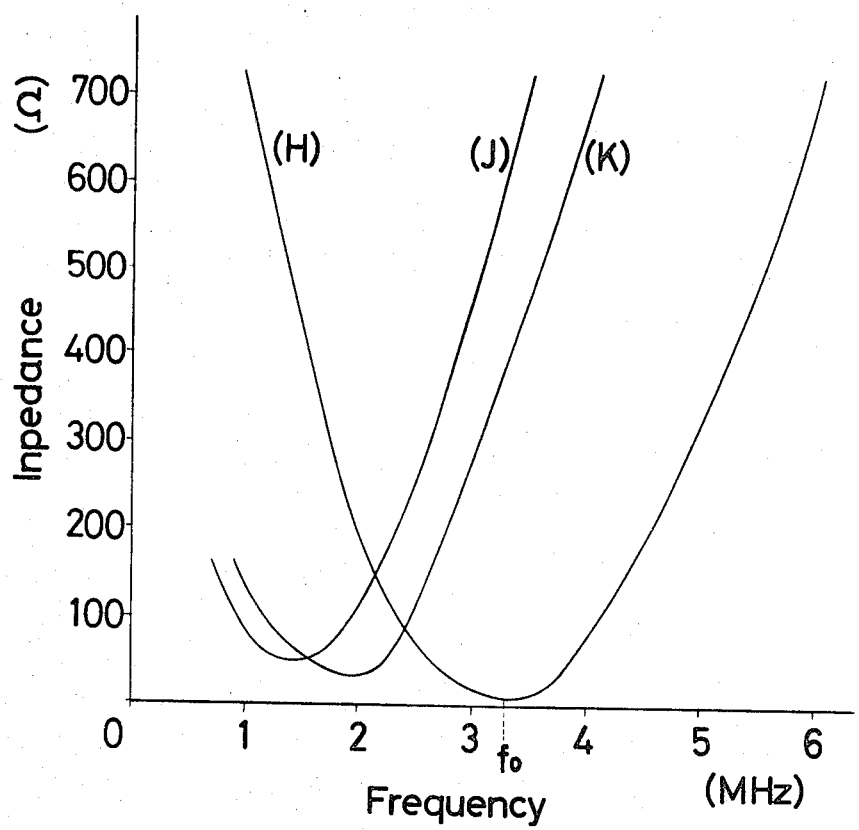

FIG. 5 shows data obtained with an apparatus employing the distribution circuit wherein the pair of electrodes was provided in the tank containing petroleum 7 meters beneath the level of the petroleum and the length of the lead wires connected to the electrodes was 7.5 meters.

In FIG. 5 curve "H" shows the feeding point impedance when only petroleum existed between the electrodes, curve "J" shows the impedance when the electrodes were short-circuited and curve "K" shows the impedance when the small particles of alumina catalyzer existed between the electrodes.

As is clear from FIG. 5, there is a remarkable difference in impedance depending upon whether the small particles exist between the electrodes or not. Where, in order to convert the impedance to a voltage, a high frequency bridge is used as the detector, the change in the bridge output voltage becomes 5 mV when only petroluem exists between the electrodes and 250 mV when the small particles exist therebetween. Furthermore, since there is substantially no effect resulting from the bubbles, it is not necessary to provide any means for preventing such bubbles from entering the space between the electrodes. Furthermore, according to this method, which detects the impedance of the distribution circuit, it is possible to detect correctly the presence of the small particles between the electrodes regardless of the length of the lead wires.

The conventional detector for detecting the presence of the small particles, which utilizes the electrostatic capacitance variation, uses low measuring frequencies at which the imaginary part $\epsilon''$ of the dielectric constant of the small particles is zero, and thus detects the presence of the small particles by measuring the change in terminal voltage due to the change in the real part $\epsilon'$ of the dielectric constant. In this method, however, since the terminal voltage changes also when the bubbles enter the space between the electrodes, it is difficult to detect the presence of the small particles correctly.

As above mentioned, the present invention utilizes a high frequency within a frequency band wherein the dielectric dispersion of the small particles occurs. The present method makes the detection of the small particles existing between the electrodes possible relatively easily by detecting the substantial decrease in the terminal voltage of the resonance circuit due to the fact that, when the small particles enter between the electrodes, the intrinsic resonance frequency $f$ of the resonant circuit is changed by the change of the real part $\epsilon'$ of the dielectric constant $\epsilon$ and the Q value is lowered by the change of the imaginary part $\epsilon''$ thereof, or by detecting the change in the resonant state of the distribution circuit from $l=(2n+1)\frac{1}{4}\lambda$ to $l=n/2\lambda$ due to the fact that, when the small particles enter between the electrodes, the impedance between the electrodes is abruptly decreased by the changes of the real part $\epsilon'$ and the imaginary part $\epsilon''$ of the dielectric constant thereof.

If the tank is of electrically conductive material, it can be used as one of the electrodes and thus the construction of the present device can be simplified.

In accordance with the present invention, the tank can be continuously operated by arranging a plurality of electrode pairs vertically in the tank to detect the level of the particles in the tank continuously and by the use of an automatic control device which controls the liquid supplying velocity and/or the circulating velocity or stops the operation when the level reaches a predetermined level.

According to the present method it is easily possible to detect the small particles not only in tanks operating under ordinary reaction conditions but also in tanks operating under very severe conditions and such detection is not impaired by the presence of bubbles as the small particles alone can be detected independently of the bubbles.

What is claimed is:

1. A method for detecting small particles in a tank, comprising the steps of, supplying a high frequency to a resonant circuit including a pair of electrodes provided within the tank, and by means of said resonance circuit detecting changes in impedance resulting from changes in the real part of the dielectric constant of the small particles existing between said electrodes and the imaginary part of the dielectric constant of said small particles due to dielectric dispersion.

2. The method defined in claim 1, wherein said high frequency supplied to said resonant circuit is selected in such a manner that it causes dielectric dispersion in the liquid but does not cause dielectric dispersion in the small particles.

3. An apparatus for detecting small particles in a tank comprising a pair of electrodes provided within the tank containing the small particles to be detected, a coil having each of its ends connected to one said electrode, a resonant circuit constituted of said coil and a capacitor formed by said electrodes, and means for supplying high frequency to said resonant circuit, whereby a high frequency which is equal to the intrinsic resonant frequency of said resonant circuit when no small particles exist between said electrodes is supplied to said resonant circuit and the presence of the small particles between said electrodes is detected by the electrical power loss resulting from the resistive component caused by the presence of the small particles between the electrodes.

4. A device for detecting fine particles in a tank, comprising a pair of electrodes provided within the tank, a pair of lead wires one end of each of which is connected to one said electrode and the other end of which is connected to a detecting means, and a high frequency supplying means for supplying a high frequency to a resonant distribution circuit formed of said pair of electrodes, said pair of lead wires and said detecting means, whereby a frequency which causes dielectric dispersion in the small particles and a standing wave in said resonance circuit is supplied to said resonant circuit and the presence of the small particles between said electrodes is detected by a change in the standing wave due to the presence of the small particles between said electrodes.

* * * * *